(12) United States Patent
Samani (10) Patent No.: US 7,771,504 B1
(45) Date of Patent: Aug. 10, 2010

(54) PRODUCING LIQUID ORGANIC FERTILIZER FROM ORGANIC SUBSTRATES

(75) Inventor: Zohrab A. Samani, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 243 days.

(21) Appl. No.: 11/866,827

(22) Filed: Oct. 3, 2007

Related U.S. Application Data (60) Provisional application No. 60/827,969, filed on Oct. 3, 2006, provisional application No. 60/883,724, filed on Jan. 5, 2007.

(51) Int. Cl.
*C05F 11/08* (2006.01)
(52) U.S. Cl. .................................. 71/8; 71/11
(58) Field of Classification Search ............ 71/8, 71/11
See application file for complete search history.

(56) References Cited

U.S. PATENT DOCUMENTS

| | | | |
|---|---|---|---|
| 1,439,188 A | 12/1922 | Poock | |
| 1,606,015 A | 11/1926 | Blackwell | |
| 2,658,824 A | 11/1953 | Dickenson | |
| 3,326,232 A * | 6/1967 | Stamps et al. | 239/727 |
| 4,244,522 A * | 1/1981 | Hartwig | 239/148 |
| 4,602,928 A * | 7/1986 | Eastin | 71/58 |
| 4,976,767 A | 12/1990 | Kinnersley et al. | |
| 5,212,904 A * | 5/1993 | Green et al. | 47/48.5 |
| 5,782,950 A | 7/1998 | Kanitz et al. | |
| 5,876,479 A | 3/1999 | Hedgpeth, IV | |
| 5,984,580 A * | 11/1999 | Ham et al. | 405/129.2 |
| 6,299,774 B1 | 10/2001 | Ainsworth et al. | |
| 6,399,359 B1 * | 6/2002 | Hofstede | 435/262.5 |
| 6,767,381 B2 | 7/2004 | Huhn | |
| 7,014,768 B2 | 3/2006 | Li et al. | |
| 2004/0000179 A1 | 1/2004 | Hiraki | |
| 2004/0172997 A1 | 9/2004 | Huang et al. | |
| 2005/0044911 A1 * | 3/2005 | Shimose | 71/8 |
| 2006/0105447 A1 * | 5/2006 | Aho | 435/262 |
| 2006/0172888 A1 | 8/2006 | Blaszczyk et al. | |

FOREIGN PATENT DOCUMENTS

| | | |
|---|---|---|
| CN | 1389438 A | 1/2003 |
| CN | 1699297 A | 11/2005 |
| JP | 07237986 | 9/1995 |

OTHER PUBLICATIONS

*Fertilizers and Their Use* Food and Agriculture Organization of the United Nations, International Fertilizer Industry Association, Rome 2000, iii-70.

"Organic farming and marketing", http://www.ers.usda.gov/briefing/organic/Accessed via http://www.archive.org/index.php May 5, 2001.

Diaz, L. F. et al., *Energy balance in compost production and use (abstract only)* Elsevier Applied Science, New York 1987.

He, Z. L. et al., "Nitrogen mineralization and transformation from composts and biosolids during field incubations in a sandy soil", *Soil Science* vol. 154, No. 2, Lippincott Williams & Wilkins, Inc. Feb. 2000, 161-169.

Mata-Alvarez, Joan, "A Dynamic Simulation of a Two-Phase Anaerobic Digestion System for Solid Wastes", *Biotechnology and Bioengineering* vol. 30, John Wiley & Sons, Inc. 1987, 844-851.

Pohland, Frederick G., "Accelerated Solid Waste Stabilization and Leachate Treatment by Leachate Recycle Through Sanitary Landfills", *Progress in Water Technology* vol. 7, Nos. 3/4, Pergamon Press, Great Britain 1975, 753-765.

* cited by examiner

*Primary Examiner*—Timothy C Vanoy
*Assistant Examiner*—Michelle Hou
(74) *Attorney, Agent, or Firm*—Deborah A. Peacock; Peacock Myers, P.C.

(57) ABSTRACT

The present invention relates to methods and apparatuses for the production of organic liquid fertilizer from waste using a two-phase process. The first phase comprises a successive extraction process whereby liquid leachate is drained from one plant or storage container and the process subsequently re-started with new fresh water. The second phase comprises an accelerated bio-leaching process wherein plant material is stored in a solid bed similar to a batch process, and a leachate (e.g., water and bacteria) is re-circulated through the solid bed until the process of hydrolysis and acidification results in dissolution of organic material into the re-circulating leachate. The leachate is thus concentrated without losing the nutrient and is subsequently used as an organic fertilizer.

15 Claims, 8 Drawing Sheets

FIG. 1

Salinity Levels:

S1: Ece = 1.5 ds/m

S2: ECe = 4.5 ds/m

S3: ECe = 6.5 ds/m

Fertilizer Levels:

F1: 120 Kg N/ha, mineral fertilizer

F2: 120 Kg N/ha, organic Liquid fertilizer

F3: 240 Kg N/ha, organic Liquid Fertilizer

PRODUCING LIQUID ORGANIC FERTILIZER FROM ORGANIC SUBSTRATES

CROSS-REFERENCE TO RELATED APPLICATIONS

This application claims priority to U.S. Provisional Patent Application Ser. No. 60/827,969, entitled "Liquid Fertilizer From Waste Using Accelerated Bioleaching," filed on Oct. 3, 2006, and U.S. Provisional Patent Application Ser. No. 60/883,724, entitled "Liquid Fertilizer From Waste Using Successive Extraction and Bioleaching," filed on Jan. 5, 2007, and the specifications thereof are incorporated herein by reference.

BACKGROUND OF THE INVENTION

1. Field of the Invention (Technical Field)

The present invention relates to methods and apparatuses for the production of liquid fertilizer from waste using successive extraction and accelerated bioleaching resulting in increased nitrogen content and decreased odor during production.

2. Description of Related Art

Note that where the following discussion refers to a number of publications by author(s) and year of publication, that due to recent publication dates certain publications are not to be considered as prior art vis-a-vis the present invention. Discussion of such publications herein is given for more complete background and is not to be construed as an admission that such publications are prior art for patentability determination purposes.

Organic farming was one of the fastest growing segments of U.S. agriculture during the 1990's (USDA-ERS 2002). U.S. sales of organic food products grew 20-25% annually during the past decade reaching $7 billion in 2000 (USDA-2002). Traditionally, organic farming has relied on composted organic material or rotation crops as sources of plant nutrients.

U.S. Patent Application Publication No. 2006/0172888 to Blasczyk et al., entitled "Natural Grass Fertilizer With Weed and Grub Control Activity," issued Aug. 3, 2006, discloses a process for making a fertilizer by combining liquid steep-water obtained by steeping vegetable matter in water and subsequently straining the solid matter from the liquid. A natural fertilizer comprising steep-water and biomass is produced.

U.S. Patent Application Publication No. 2004/0172997 to Huang et al., entitled "Plant Nutrition Formulated By Recovery Filtrate From Plant Fiber Biopulp And Method Thereof," issued Sep. 9, 2004, discloses a plant nutrition formulation and method relating to the recovery filtrate from plant biopulp that is not harmful to the environment.

U.S. Pat. No. 7,014,768 to Li et al., entitled "Process For Removal And Recovery Of Nutrients From digested Manure Or Other Organic Wastes," issued Mar. 21, 2006, discloses a multi-step process of removing nutrients and water from organic wastes and recycling digested liquids back through the digested solids at an elevated temperature to create a biofertilizer with an elevated nitrogen content.

U.S. Pat. No. 6,299,774 to Ainsworth et al., entitled "Anaerobic Digester System," issued Oct. 9, 2001, discloses a process that involves the anaerobic digestion of feedstocks at low to high temperatures in batch reactors to produce fertilizer.

U.S. Patent Application Publication No. 2004/0000179 to Hiraki, entitled "Method For Composting Organic Wastes," issued Jan. 1, 2004, discloses a method for composting wastes with water and effective microorganisms (EM) at a suitable temperature to create a fertilizing compost.

The present invention comprises generating liquid fertilizer that can be applied through irrigation systems. Liquid fertilizer has several potential advantages compared to traditional composting methods. For example, liquid fertilizer is a clean plant-based fertilizer and does not have the typical problems of weed seeds, pathogens, or high sodium content. Also, liquid fertilizer is dissolved in water and is easily available for plant uptake contrary to composted material where only a fraction of the nutrient is available for plant uptake and often needs to be supplemented with mineral fertilizer. Also, liquid fertilizer can be applied to plants on a timely basis as needed. The following are examples of devices and processes that produce fertilizer.

The present invention preferably uses a plant source, anaerobically digests the plant source, and subsequently uses a sequential bioleaching process which increases the amount of nutrient extracted or leached from a fixed amount of organic plant source. The leachate is concentrated without losing the nutrient and is subsequently used as a fertilizer (preferably an organic fertilizer). The present invention uses moderate heat at an optimum temperature to enhance hydrolysis and acidification and reduces the time required to produce the nutrient-rich leachate. No pre-treatment is required to digest the plant source. The present invention is lightweight, inexpensive, and uses a successive extraction process to produce an organic fertilizer with an enhanced nitrogen content.

BRIEF SUMMARY OF THE INVENTION

The preferred invention relates to an apparatus and method of producing liquid fertilizer using successive extraction and accelerated bioleaching. The preferred embodiment is described below.

Liquid fertilizer is produced in an apparatus comprising a first phase container, a leachate distribution system, and an external second-phase container. The first-phase container holds leachate and packed plant matter. The leachate is distributed via a system comprising a circulation pump, piping, a leachate distribution system, and a leachate drain system. The external second-phase container stores and heats the leachate.

The liquid fertilizer is produced by mixing leachate, packing plant material, and adding a fluid in at least one first-phase container and by accelerating bioleaching. Accelerating bioleaching comprises recirculating the leachate periodically through the first container, hydrolyzing the leachate, acidifying the leachate, and dissolving the organic material into the recirculating leachate. The leachate the first-phase container is augmented by adding additional fluid.

The leachate is successively extracted from the first-phase container and replaced with a fluid. The leachate is then disposed in an external second-phase container where it is concentrated by controlling heating by heating at above approximately 80 degrees F., storing the leachate in the second phase container and exposing it to sunlight, or boiling. Leachate odor is minimized by the controlled heating, and concentrating the liquid leachate prevents the loss of nutrient or organic content. Finally, the leachate is removed from the external second-phase container as liquid organic fertilizer.

Novel features and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

An embodiment of the present invention provides a liquid fertilizer made from waste using accelerated bioleaching and successive extraction and a method for producing the liquid fertilizer.

As used in the specification and claims herein, the terms "a", "an", and "the" mean one or more. The term "leachate" means a fluid and bacteria. The term "fluid" means continuous amorphous substance that tends to flow and to conform to the outline of its container, such as water, or any other liquid.

Figure 1:
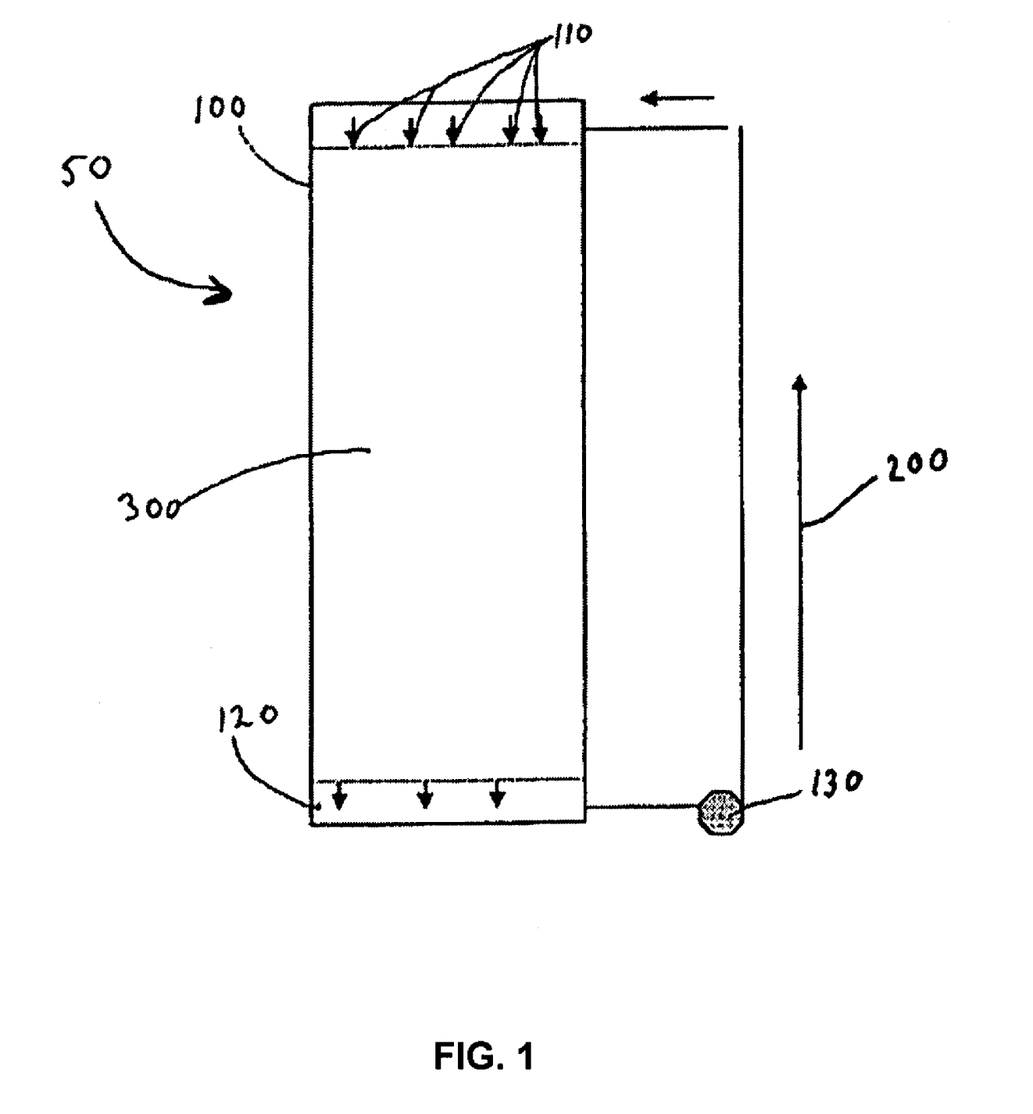
FIG. 1 is a schematic representation of a cross-section of an embodiment of the leaching system of the present invention.

Preferably, the process of generating liquid fertilizer in accordance with the present invention comprises a two-phase process. In the first phase, dilute liquid fertilizer (preferably organic liquid fertilizer) is generated through an accelerated bioleaching process preferably utilizing a system as depicted in FIG. 1. The process is based on an accelerated bio-leaching process wherein material, preferably plant material including, but not limited to, green grass and alfalfa, is stored in a solid bed similar to a batch process, and a leachate (e.g., water and bacteria) is re-circulated through the solid bed until the process of hydrolysis and acidification results in dissolution of organic material into the re-circulating leachate.

A non-limiting embodiment of the present invention is shown in FIG. 1. System 50 comprises, in part, column 100 (which can be of any appropriate material such as PVC and of suitable dimensions such as of approximately 3 feet high and one foot in diameter). Drip irrigation leachate distribution system 110 is provided at the top of column 100. Sub-drain system 120 with a filter is installed at the bottom of column 100 to collect leachate 200. Fresh grass waste 300 is packed in column 100 between leachate distribution system 110 and sub-drain system 120. Sufficient water is applied to satisfy the field capacity of the organic media and provide an additional 20% leachate at the bottom. Leachate 200 is re-circulated (via, for example, pump 130) periodically through system 50. Preferably, samples are taken periodically to analyze for nutrient and organic content of leachate.

In the second phase, the dilute liquid fertilizer is concentrated using either or both of two different methods. In a first method, leachate 200 is concentrated through controlled heating at 80-85 degrees F. In the second method, leachate 200 is concentrated using a solarization approach where liquid is stored in an outdoor container covered with clear plastic with vents and leaving in the sun for a few days. The purpose of the concentration is to facilitate the handling, transportation and application of the organic liquid fertilizer.

The present invention also addresses the problem of salinity that is detrimental to many crops. Salt accumulation limits the uptake and transport to nutrients that have an effect on plant growth. Uptake of nitrogen in saline conditions is reduced in addition to dry mass production. Increased inorganic nitrogen nutrition has been shown to decrease ion toxicity under this condition. Additionally, it is well known to apply manure to provide organic nitrogen. However, the use of organic nitrogen from an organic liquid fertilizer in saline conditions is beneficial to plant growth.

Thus, the present invention comprises producing liquid fertilizer from waste (e.g., green waste) using an accelerated bio-leaching process. The liquid fertilizer can be concentrated using controlled heating without a significant loss of nutrient or organic content. The concentrated liquid can be classified as fertilizer in accordance with both international and U.S. fertilizer standards. The fertilizer can be applied through irrigation systems on a timely basis and can produce higher crop yield in comparison to mineral fertilizer. The fertilizer can be applied through drip tapes in a field scale or other drip irrigation system.

Example 1

A non-limiting example of a system for the production of liquid fertilizer was constructed and used as described herein for approximately three weeks of leaching. Table 1 shows the nutrient composition for the resulting dilute leachate composition at the end of the first phase.

TABLE 1

Nutrient composition of dilute leachate at the end of first phase.

| Measured parameters | Amount, mg/L |
| --- | --- |
| Total organic content | 27,800 |
| Total N | 7,100 |
| Total P | 950 |
| Potasium, K | 3,300 |
| Ca | 1,100 |
| Mg | 290 |

TABLE 1-continued

Nutrient composition of dilute leachate at the end of first phase.

| Measured parameters | Amount, mg/L |
|---|---|
| Fe | 49 |
| Mn | 8 |
| Zn | 0.51 |

The dilute liquid had a pH of 5.7. The liquid was then heated at a controlled temperature of 80-85 degrees F. in order to concentrate the nutrient. The volume of the concentrated liquid was 10% of the original volume, and had a pH of 5.4. Table 2 shows the nutrient content of the concentrated fertilizer.

TABLE 2

Nutrient composition of concentrated samples at the end of second phase.

| Measured parameters | Amount, mg/L |
|---|---|
| Total organic content | 230,00 |
| Total N | 63,500 |
| Total P | 7,505 |
| Potasium, K | 27,500 |
| Ca | 10,300 |
| Mg | 2,500 |
| Fe | 420 |
| Mn | 78 |
| Zn | 5.2 |

The concentrated liquid described in Table 2 is properly classified as commercial fertilizer as it has more than 6% nutrient by weight. The International Fertilizer Industry Association ("IFA") defines fertilizer as "a natural or manufactured material with at least 5% of one or more of the three primary nutrients (N, $P_sO_5$, $K_2O$). In the United States, fertilizer preferably has a combined NPK of at least 6% in order to be classified as fertilizer. Fertilizers with only one primary nutrient are called "straight fertilizer", and with two or three primary nutrients are called "multi-nutrient fertilizers."

One noticeable effect of the concentration was that, a few days after the treatment was begun, the liquid had virtually no odor, contrary to the dilute sample following the first phase which has a strong odor like that of sewage. It appears that compounds causing the odor are the first to break away from the liquid as the concentration process begins.

Example 2

In another non-limiting example, green house experiments were conducted to evaluate the feasibility of utilizing organic fertilizer in the production of organic green chile. A randomized block design experiment with nine treatments and four replications was used. The treatments consisted of three levels of soil salinity (ECe=1, 5, 4.5, 6.5) and three levels of fertilizer. The levels of fertilizers were: 120 Kg of N/ha of commercial mineral fertilizer, 120 Kg N/ha of organic liquid fertilizer and 200 Kg N/ha of organic liquid fertilizer.

Figure 2:
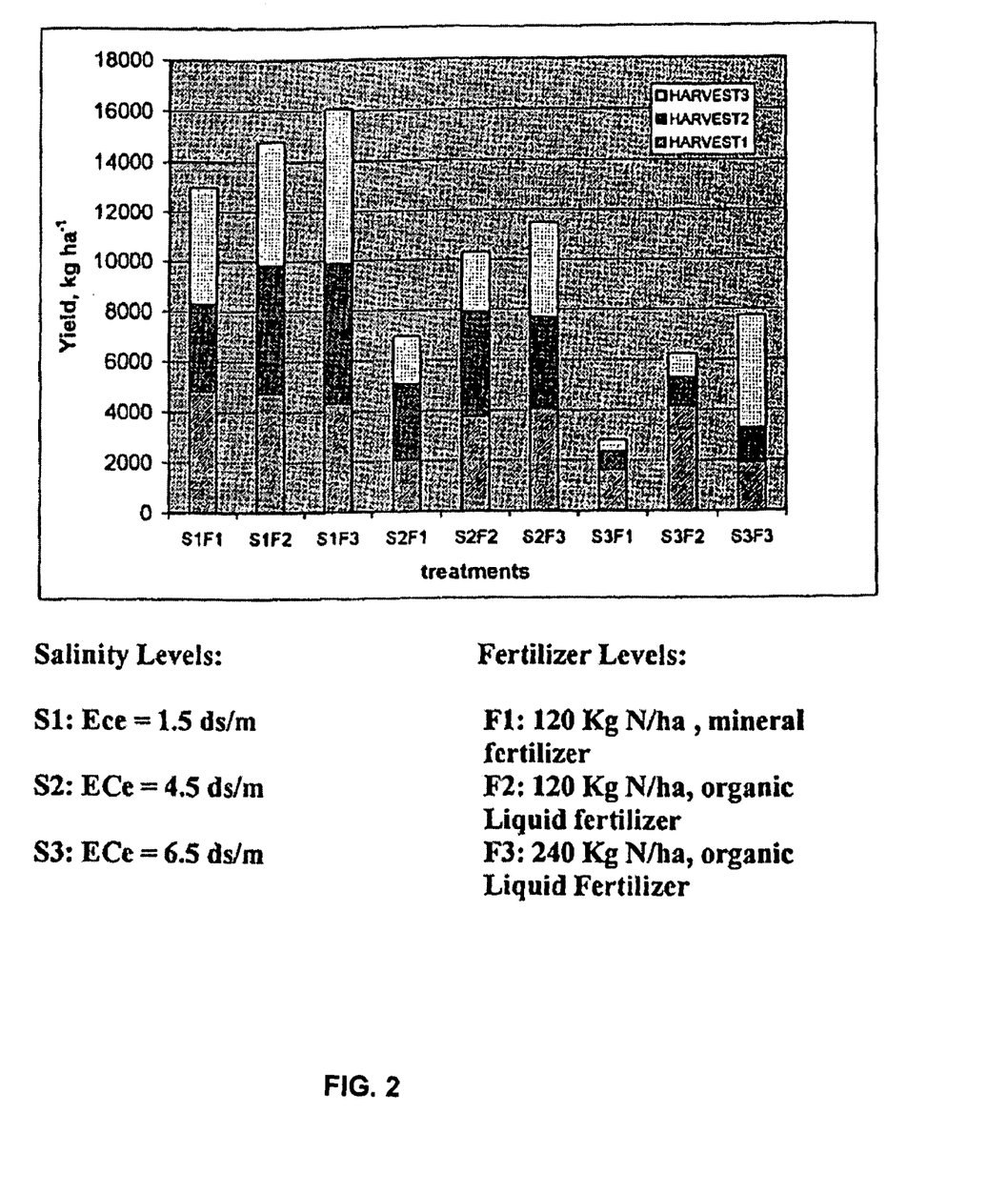
FIG. 2 is a graph showing a comparison of chile yield produced with an embodiment of the liquid fertilizer of the present invention and a commercial mineral fertilizer.

FIG. 2 shows the results of the experiment with the first three harvests. In the green house experiment, liquid fertilizer was diluted in the irrigation water and applied on a periodic basis according to experiment station recommendations. The green house experiment showed that the yield of green chile was increased significantly by using organic liquid fertilizer, especially in soils with high salinity. The organic liquid fertilizer not only increases the yield, but also produces an organic crop that has considerably higher market value. Traditionally, one of the challenges of the organic farming industry has been to match the quality and quantity of crops grown by commercial fertilizer. A high level of organic in the solution reduces the negative impact of salinity in the soil.

Example 3

In another non-limiting example, the liquid organic fertilizer was compared to a chemical fertilizer for chile pepper growth.

Chile pepper (*Capsicum annuum* L. cv. Sandia) was grown in green house conditions. The type of soil is a Brazito sandy loam with an electrical conductivity (EC) of 0.59 dS m$^{-1}$ and a pH of 7.7. A mixture of $CaCl_2$ and NaCl in a ratio of 1:1 was used to prepare saline solutions, which were sprayed evenly over each plastic pot of 15 kg soil according to three levels of salinity: S1 (1.7 dS/m), S2 (5.0 dS/m), and S3 (6.5 dS/m). Ammonium nitrate and an organic liquid fertilizer were the two nitrogen sources. The first was applied at a rate of 120 kg ha$^{-1}$ (F1), and the second in two rates: 120 kg ha$^{-1}$ (F2) and 200 kg ha$^{-1}$ (F3). The organic liquid fertilizer's chemical properties are shown in Table 3.

TABLE 3

Chemical properties of organic liquid fertilizer.

| Property | Value |
|---|---|
| Organic matter | 2.78% |
| pH | 5.7 |
| Electrical conductivity | 22.7 dS/m |
| Nitrogen | 0.70% |
| Phosphate | 0.55% |
| Potash | 0.33% |
| Ca | 1100 ppm |
| Na | 267 ppm |
| Mg | 290 ppm |
| Fe | 49 ppm |
| Mn | 8 ppm |
| Zn | 0.51 ppm |

The three salinity levels were combined with the three rates of fertilizer to give nine treatments. Fertilizers were manually applied and split in four applications. Pepper seedlings were transplanted in pots arranged in a randomized complete block design with four replications.

Water use efficiency (WUE) was calculated as the ratio of yield (g/plant) and the amount of water used to reach this yield.

Soil pH and EC was measured in the saturation extract using a glass pH electrode and a temperature-compensating conductivity meter, respectively. Soil $NH_4^+$ and $NO_3^-$ were analyzed using a Multiscan Ascent plate reader spectrophotometer.

Dry weights of roots, shoots, leaves, and fruits were determined after drying for 76 hours at 70 degrees C. Total plant nitrogen was determined using the Kjeldahl digestion procedure (TKN). Ground plant parts were digested in concentrated $H_2SO_4$ in a block digester and quantified as $NH_4^+$ on an AutoAnalyzer II ammonia system.

Data was analyzed with the SAS statistical package. Differences between treatments were tested using Tukey's students test.

The final soil solution reaction salt and nitrogen concentrations are shown in Table 4.

TABLE 4

Effects of salinity and fertilizer levels on some soil characteristics of chile pepper grown in greenhouse conditions

| Treatments | pH | EC dS m$^{1}$ | NH$_2^+$ Mg kg$^{-1}$ | NO$_3$ Mg kg$^{-1}$ | Total-N Mg kg$^{-1}$ |
|---|---|---|---|---|---|
| S1F1 | 7.93 ab | 1.375 c | 0.287 b | 1.323 ab | 1.610 ab |
| S1F2 | 8.00 a | 1.580 c | 0.000 b | 2.650 ab | 2.650 ab |
| S1F3 | 7.84 bcd | 1.877 c | 0.395 b | 0.000 b | 0.395 b |
| S2F1 | 7.63 c | 3.997 b | 0.820 b | 2.538 ab | 3.358 ab |
| S2F2 | 7.76 cdc | 4.382 b | 1.352 ab | 0.000 b | 1.353 b |
| S2F3 | 7.70 cde | 4.315 b | 1.950 ab | 0.000 b | 1.950 ab |
| S3F1 | 7.69 de | 6.405 a | 0.960 b | 22.135 a | 23.095 a |
| S3F2 | 7.75 de | 5.902 a | 2.535 ab | 1.395 ab | 3.930 ab |
| S3F3 | 7.91 abc | 6.475 a | 4.140 a | 9.805 ab | 13.945 ab |

Each value in the columns is the mean value of four plants. Means with different letters indicate significant differents (P ≦ 05) by Tukey's test.

Soil reaction (pH) showed some variation. The final electrical conductivities (EC) show a light decrement compared to original values: from 1.7 to 1.61 dS m$^{-1}$ for 51, from 5.0 to 4.23 dS m$^{-1}$ for S2, and from 6.5 to 6.26 dS m$^{-1}$ for S3. However, there were differences between treatments. Soil NH$_4$—N was slightly affected by the kind of fertilization and salinity. The same response had soil NO$_3$—N and Total-N. However, a high concentration was observed for NO$_3$—N form in the S3F1 treatment.

Figure 3:
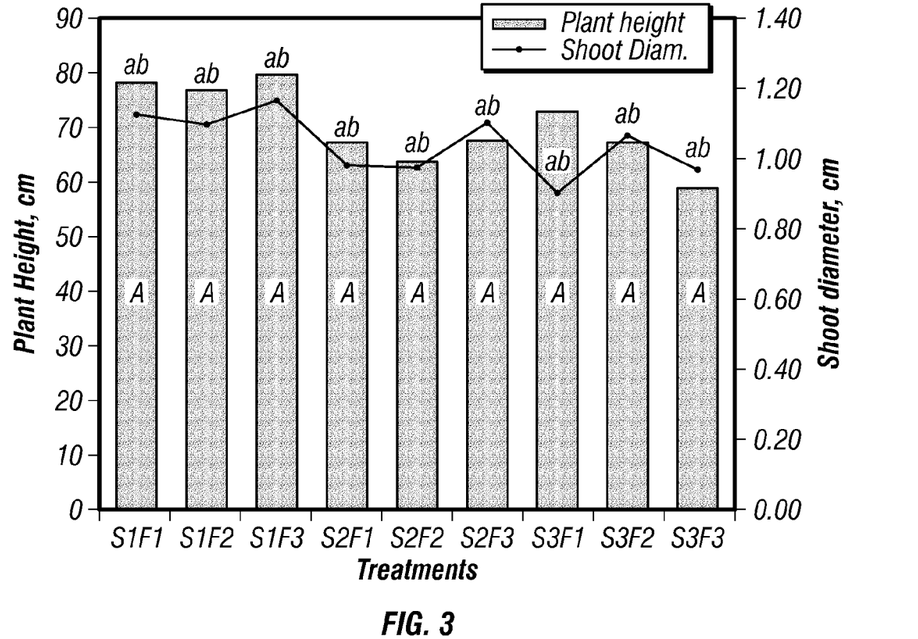
FIG. 3 is a graph showing salinity and fertilizer effect on plant height (cm) and shoot diameter (cm) of chile pepper plant grown in greenhouse conditions.

According to ANOVA, plant height showed a similar response to saline (65.83 cm for S2, and 66.00 cm for S3) and non-saline (78.45 cm for 51) conditions while the treatments had small effects on shoot diameter (1.13 cm for S1, 1.01 cm for S2, and 0.97 cm for S3). Results are shown in FIG. 3.

Influence of salinity and nitrogen source on leaves, shoots, and root dry weights are shown in Table 5. The dry weights of shoots and roots components decreased significantly in response to increments in salinity (from 35.685 g to 25.886 g for 51 and S3 in roots, and 112.226 g to 83.386 g for the same salinity levels for shoots). However, in leaves there was a decrement in dry weight for S2 (57.165 g), and an increment in S3 (68.509 g) with respect to S1 (66.329 g).

TABLE 5

Effects of salinity and fertilizer levels on dry weights (g) of some chile pepper plant parts.

| Treatments | Leaves | Shoot | Root |
|---|---|---|---|
| S1F1 | 71.313 ab | 119.955 a | 35.965 ab |
| S1F2 | 44.440 c | 101.130 abc | 31.508 abc |
| S1F3 | 83.205 a | 115.595 ab | 40.065 a |
| S2F1 | 69.358 abc | 89.575 abcd | 28.475 abc |
| S2F2 | 44.743 c | 62.845 d | 22.205 c |
| S2F3 | 57.395 bc | 99.648 abc | 31.028 abc |
| S3F1 | 84.843 a | 83.088 cd | 25.478 bc |
| S3F2 | 46.203 c | 84.158 bcd | 25.863 bc |
| S3F3 | 74.485 ab | 84.115 bcd | 26.320 bc |

Each value in the columns is the mean value of four plants. Means with different letters indicate significant differences (P ≦ 0.05) by Turkey's test.

Figure 4:
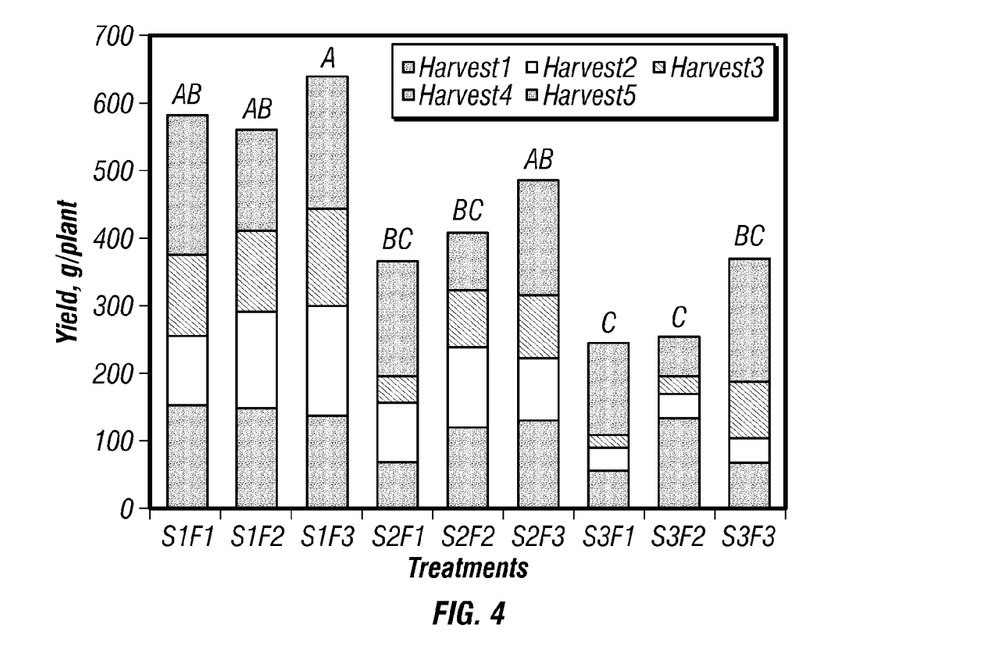
FIG. 4 is a graph showing salinity and fertilizer effect on total yield of chile pepper (g/plant) grown in greenhouse conditions.

Generally, yields for chile pepper plants were affected by saline and fertilizer treatments. The total yield is shown in FIG. 4 while the fresh weights in different harvests are provided in Table 6.

TABLE 6

Effects of salinity and fertilizer levels on yield of chile pepper in different harvests (g/plant).

| Treatments | Harvest 1 | Harvest 2 | Harvest 3 | Harvest 4 | Harvest 5 |
|---|---|---|---|---|---|
| S1F1 | 146.37 a | 105.22 abc | 140.11 abc | 112.65 ab | 73.47 a |
| S1F2 | 144.01 a | 154.52 a | 149.07 ab | 85.00 ab | 21.29 a |
| S1F3 | 131.28 ab | 168.48 a | 187.01 a | 149.84 a | 2.82 a |
| S2F1 | 62.42 ab | 91.64 abc | 56.95 bc | 74.06 ab | 78.85 a |
| S2F2 | 113.90 ab | 125.93 ab | 98.09 abc | 57.93 ab | 8.24 a |
| S2F3 | 123.22 ab | 95.60 abc | 114.77 abc | 106.16 ab | 39.83 a |
| S3F1 | 50.42 b | 21.06 c | 13.91 c | 65.89 ab | 85.19 a |
| S3F2 | 126.14 ab | 34.65 bc | 27.61 bc | 30.42 b | 29.41 a |
| S3F3 | 58.17 ab | 41.81 bc | 81.02 abc | 132.82 ab | 51.17 a |

Each value in the columns is the mean value of four plants. Means with different letters indicate significant differences (P ≦ 0.05) by Tukey's test.

The greater yields were obtained when 200 kg ha$^{-1}$ (F3) of organic fertilizer was applied to chile pepper plants. Total yields of chile pepper increased 18.19% (1155.7 g), 15.17% (1126.1 g), and 14.59% (1462.7 g) for S1 (1.8 dS m$^{-1}$), S2 (4.3 dS m$^{-1}$), and S3 (6.4 dS m$^{-1}$) respectively compared with yield of chile pepper (977.82 g) grown with NH$_4$NO$_3$ (F1, 120 kg ha$^{-1}$) in non-saline soil conditions S1 (1.3 dS m$^{-1}$).

In relation to yields in different harvests (Table 6), the higher yields were obtained using organic fertilizer as the nitrogen source. Only in non-saline conditions were yields using NH$_4$NO$_3$ greater than yields using organic fertilizer in the first and last harvests. However, in the last harvest there were no differences between treatments.

Figure 5:
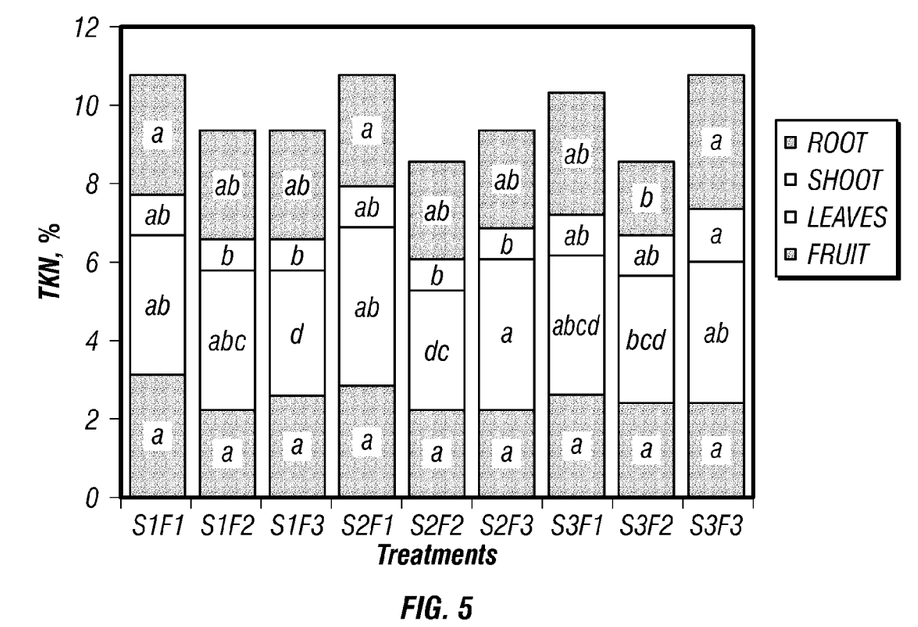
FIG. 5 is a graph showing salinity and fertilizer effect on Total Kjeldahl Nitrogen (TKN) of some parts of chile pepper plant grown in greenhouse conditions.

Table 7 and FIG. 5 show the total Kjeldahl Nitrogen for the different plant components. While fruit TKN was not affected by salinity and fertilization treatments, in shoots and roots TKN, salinity and nitrogen source had a small effect. However, leaves TKN concentrations decreased at higher salinities for F1 and F2 treatments.

TABLE 7

Effects of salinity and fertilizer levels on Total Kjeldahl Nitrogen (TKN, %) of some chile pepper plants)

| Treatments | Fruit | Leaves | Shoot | Root |
|---|---|---|---|---|
| S1F1 | 3.087 a | 3.582 ab | 1.305 ab | 2.712 ab |
| S1F2 | 2.642 a | 3.275 abc | 0.620 b | 2.680 ab |
| S1F3 | 3.085 a | 2.737 d | 0.637 b | 2.632 ab |
| S2F1 | 3.260 a | 3.477 ab | 1.110 ab | 2.930 a |
| S2F2 | 2.542 a | 2.782 cd | 0.780 b | 2.390 ab |
| S2F3 | 2.585 a | 3.602 a | 0.765 b | 2.390 ab |
| S3F1 | 3.132 a | 3.155 abcd | 1.192 ab | 2.830 a |
| S3F2 | 2.757 a | 3.027 bcd | 0.947 ab | 2.027 b |
| S3F3 | 2.832 a | 3.372 ab | 1.540 a | 2.840 a |

Each value in the columns is the mean value of four plants. Means with different letters indicate significant differences (P = 0.05) by Turkey's test.

Figure 6:
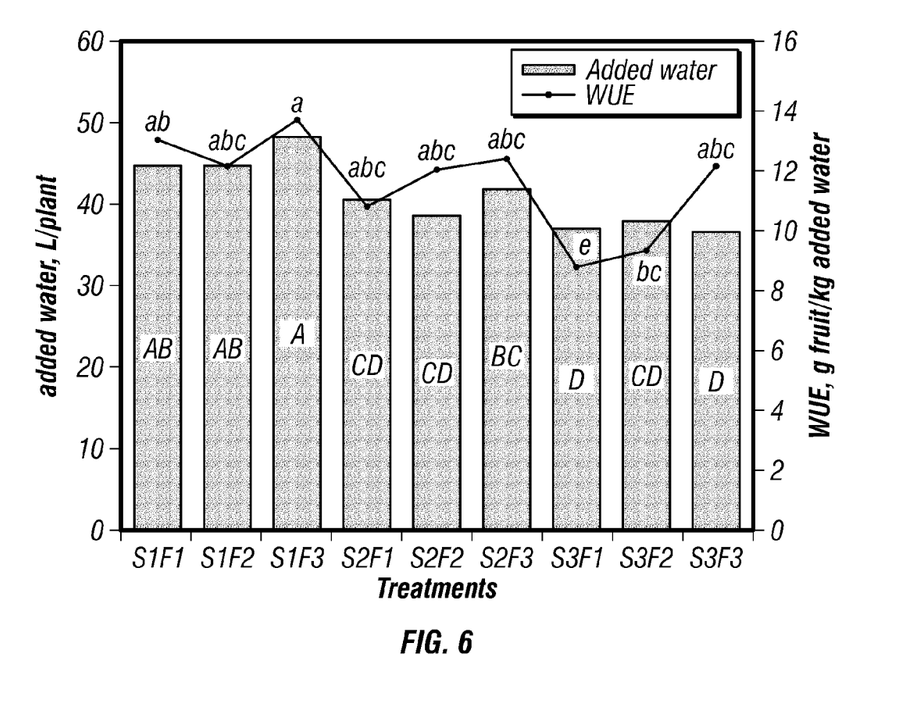
FIG. 6 is a graph showing salinity and fertilizer effect on average added water and water use efficiency (WUE) of chile pepper grown in greenhouse conditions.

The difference in value of applied water as salinity increased is shown in FIG. 6. Significantly, the quantity of water was diminished by increasing salinity: from an average of 46,310.17 ml for S1, 37,325.15 ml for S2 to 32,762.17 ml for S3.

The higher plant water use efficiencies (FIG. 6) were achieved using organic fertilizer for the three salinity levels: 13.26, 12.17, and 11.45 g fruit per kg added water in treatments fertilized with 200 kg ha$^{-1}$ of organic fertilizer 12.21, 11.52, and 7.40 g fruit per kg added water in the treatments fertilized with 120 kg ha$^{-1}$ of organic fertilizer compared to 12.78, 9.70, and 7.19 g fruit per added water in the treatments fertilized with 120 kg ha$^{-1}$ of NH$_4$NO$_3$ for S1, S2, and S3, respectively.

Example 4

Another embodiment of the present invention was demonstrated by a non-limiting example of a system for the production of liquid fertilizer, constructed and used as described herein, for approximately three weeks of leaching. Grass and/or alfalfa were placed in the system container. Bacteria were added at 120° F. Water was added to the container and then the container was sealed. The dilute liquid was stored in the external storage container. The system preferably comprises two digesters because these digesters are smaller, less expensive, and improve leaching.

The liquid was removed after fifteen days and replaced with fresh water. Fresh water was added two or three more times during the bioleaching process. This resulted in a twice higher yield. Previous yields were, after one week, a 30% yield of 0.3 mg/liter. After two weeks, a 72% yield of 0.76 mg/l resulted.

The liquid was then boiled in order to concentrate the nutrient. Heated water was subsequently added and the concentration was doubled. An acid or base, depending on the type of bacteria, was added.

One noticeable effect of the concentration was that, a few days after the treatment was begun, the liquid had virtually no odor, contrary to the dilute sample following the first phase which had a strong odor like that of sewage. Compounds that caused the odor were the first to break away from the liquid as the concentration process began.

In addition to high nutrient concentration and ease of handling, not having an odor is a noteworthy advantage for an organic fertilizer. Odor was also reduced when the liquid fertilizer was put in a container and left in the sun for a few days so that the volatile aromatic compounds were vaporized.

Preferably, the process of generating liquid fertilizer in accordance with the present invention comprises a two-phase process. The first phase comprises a successive extraction process whereby liquid leachate is drained from one plant or storage container after four weeks and the process subsequently started with new fresh water. The successive extraction process is based on an accelerated bio-leaching process wherein material, preferably plant material including, but not limited to, green grass and alfalfa, is stored in a solid bed similar to a batch process, and a leachate (e.g., water and bacteria) is re-circulated through the solid bed until the process of hydrolysis and acidification results in dissolution of organic material into the re-circulating leachate.

Figure 10:
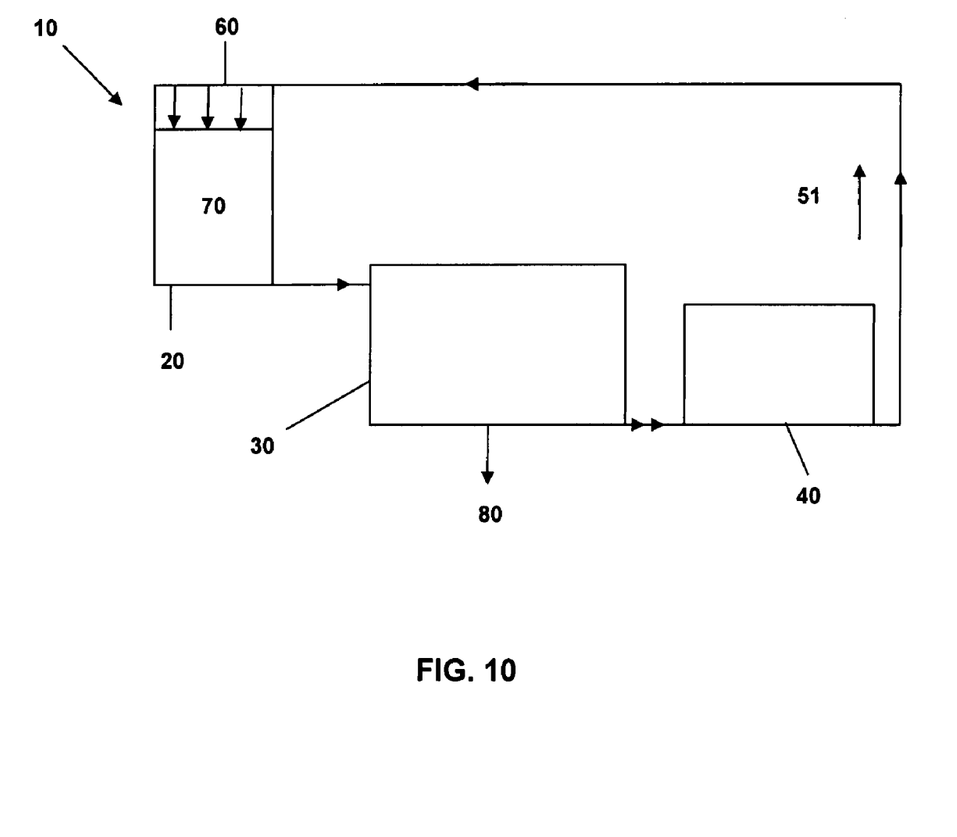
FIG. 10 is a schematic representation of an embodiment of the leaching system of the present invention.

A non-limiting embodiment of the present invention is shown in FIG. 10. System 10 comprises, in part, mixing container 20 into which bacteria, organic material such as grass or alfalfa, and water is added. External storage container 30 is provided to collect leachate 51. Fresh grass waste 70 is packed in container 20 between leachate distribution system 60 and external storage container 30 that facilitates using multiple fermenters with a single storage unit. Liquid leachate 80 is successively extracted. Sufficient water is applied to satisfy the field capacity of the organic media and provide an additional 20% leachate at the bottom. Leachate 51 is re-circulated (via, for example, pump 40) periodically through system 10. Preferably, samples are taken periodically to analyze for nutrient and organic content of leachate.

Example 5

In the second phase, the dilute liquid fertilizer is concentrated using either or both of two different methods. In a first method, the leachate (e.g. from grass) was concentrated through controlled heating at 50° C. for two days. After two days, only a small amount of odor was detectable compared to a very strong odor in the beginning. The sample volume was reduced to 0.18 liters and the total nitrogen content was measured at 75,400 mg/liter compared to 7,000 mg/liter prior to the treatment. The sample was therefore concentrated by a factor of eleven with only a small amount of nitrogen loss. In a second method, leachate was heated in a closed environment at 90° C. The heat treatment was required to kill potential pathogens and to increase nitrogen concentration. Nitrogen concentration increased from 7,000 parts per million (ppm) to 12,600 ppm. The volume was reduced by 53%. The organic liquid fertilizer was heat treated without losing nitrogen. The purpose of the concentration is to facilitate the handling, transportation and application of the organic liquid fertilizer.

The preceding examples can be repeated with similar success by substituting the generically or specifically described reactants and/or operating conditions of this invention for those used in the preceding examples.

Figure 7:
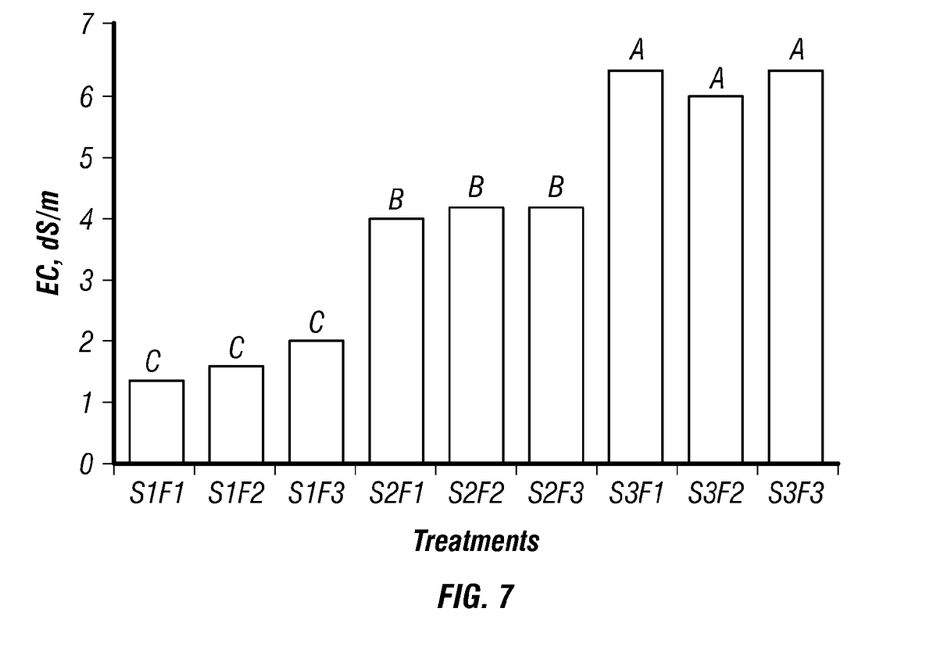
FIG. 7 is a graph showing salinity and fertilizer effect on soil electrical conductivity (EC) of chile pepper grown in greenhouse conditions.
Figure 8:
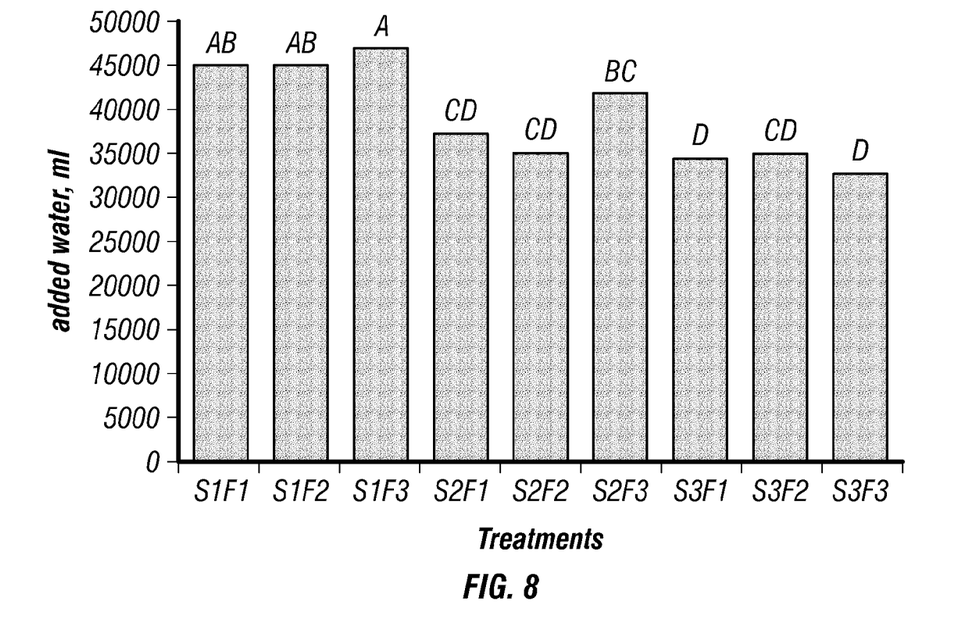
FIG. 8 is a graph showing salinity and fertilizer effect on average added water of chile pepper grown in greenhouse conditions.
Figure 9:
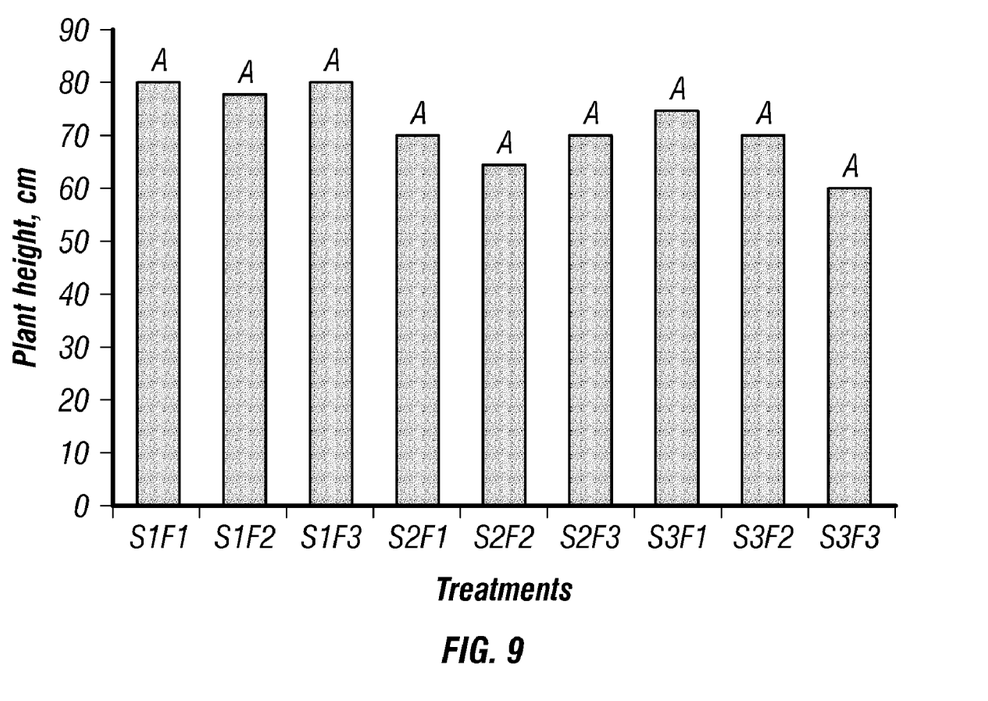
FIG. 9 is a graph showing salinity and fertilizer effect on plant height (cm) of chile pepper grown in greenhouse conditions.

FIG. 7 shows salinity and fertilizer effect on soil electrical conductivity (EC) of chile pepper grown in greenhouse conditions. FIG. 8 shows salinity and fertilizer effect on average added water of chile pepper grown in greenhouse conditions. FIG. 9 shows salinity and fertilizer effect on plant height (cm) of chile pepper grown in greenhouse conditions.

Figure 11:
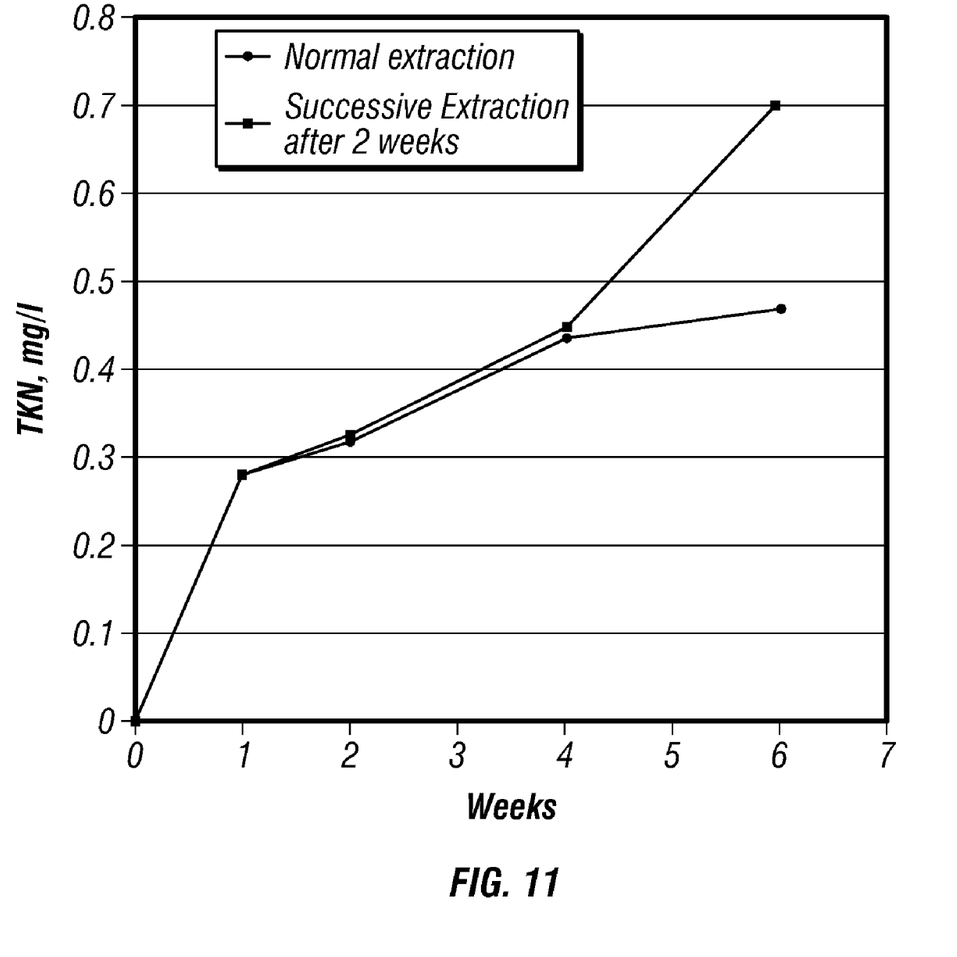
FIG. 11 is a graph showing a comparison of total nitrogen produced by a continuous extraction method and total nitrogen produced by a successive extraction method, over time, produced with an embodiment of the liquid fertilizer of the present invention.

FIG. 11 shows the increased efficiency using successive extraction methods where the liquid is removed from the storage container at discrete intervals. Fresh water is subsequently added to the external storage containers. A resulting increased efficiency is noted after four weeks.

The present invention also uses warm water (e.g. 120 to 130° F.) with grass or other plant materials to accelerate the fermentation process. The pH dropped much faster with warm water than with ambient temperature water.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated herein by reference.

What is claimed is:

1. An apparatus for producing liquid fertilizer comprising:
   a first phase container for mixing leachate, packing plant material, and adding a fluid thereby accelerating bioleaching;
   a leachate distribution system;
   a leachate successive extraction system;
   an external second-phase container disposed adjacent to and downstream of said first phase container for collecting leachate; and
   a leachate concentration system for concentrating the leachate by controlling heating by boiling.

2. The apparatus of claim 1 wherein said first-phase container comprises a batch process solid bed.

3. The apparatus of claim 2 wherein said solid bed comprises leachate and packed plant matter.

4. The apparatus of claim 1 wherein said leachate distribution system further comprises a circulation pump, piping, a leachate distribution system, and a leachate drain system.

5. The apparatus of claim 1 wherein said external second-phase container comprises a heatable leachate storage container.

6. A method for producing liquid fertilizer comprising the steps of:
- mixing leachate, packing plant material, and adding a fluid in at least one first-phase container;
- accelerating bioleaching;
- successively extracting the leachate from the first-phase container;
- replacing with a fluid;
- disposing the leachate in at least one external second-phase container;
- concentrating the leachate comprising the step of controlling heating by boiling; and
- removing the leachate from the external second-phase container as liquid fertilizer.

7. The method of claim 6 wherein the step of accelerating bioleaching comprises recirculating the leachate periodically through the first container, hydrolyzing the leachate, acidifying the leachate, and dissolving the organic material into the recirculating leachate.

8. The method of claim 6 further comprising augmenting the leachate in the first-phase container by adding a fluid to the leachate.

9. The method of claim 6 wherein the step of controlling heating comprises storing the leachate in the second-phase container and exposing it to sunlight.

10. The method of claim 6 wherein the step of controlling heating further comprises minimizing leachate odor.

11. The method of claim 6 wherein the step of concentrating the liquid leachate prevents the loss of nutrient or organic content.

12. The method of claim 6 comprising producing organic liquid fertilizer.

13. A method for producing liquid fertilizer comprising the steps of:
- mixing leachate, packing plant material, and adding a fluid in at least one first-phase container;
- accelerating bioleaching;
- successively extracting the leachate from the first-phase container;
- replacing with a fluid;
- disposing the leachate in at least one external second-phase container;
- concentrating the leachate, wherein the step of concentrating the liquid leachate comprises controlling heating, wherein the step of controlling heating comprises heating at above approximately 80 degrees F.; and
- removing the leachate from the external second-phase container as liquid fertilizer.

14. The method of claim 13 wherein the step of controlling heating further comprises storing the leachate in the second-phase container and exposing it to sunlight.

15. The method of claim 13 wherein the step of controlling heating further comprises minimizing leachate odor.

* * * * *